United States Patent
Vitale et al.

(10) Patent No.: US 12,017,958 B2
(45) Date of Patent: Jun. 25, 2024

(54) METHOD FOR CONSTRUCTING SCIENTIFICALLY ENGINEERED AND CONSTRUCTED UNPAVED RUNWAYS

(71) Applicant: MIDWEST INDUSTRIAL SUPPLY, INC., Canton, OH (US)

(72) Inventors: Robert W. Vitale, Canton, OH (US); Matthew Lyons, Medina, OH (US); Matthew Mefford, Akron, OH (US); Maurice Fenelon, Thunder Bay (CA); Gina Greenlee, Canton, OH (US)

(73) Assignee: MIDWEST INDUSTRIAL SUPPLY, INC.

( * ) Notice: Subject to any disclaimer, the term of this patent is extended or adjusted under 35 U.S.C. 154(b) by 0 days.

(21) Appl. No.: 18/190,414

(22) Filed: Mar. 27, 2023

(65) Prior Publication Data
US 2023/0227360 A1    Jul. 20, 2023

Related U.S. Application Data

(63) Continuation of application No. 17/393,513, filed on Aug. 4, 2021.

(51) Int. Cl.
*E01C 7/36* (2006.01)
*C04B 24/12* (2006.01)
(Continued)

(52) U.S. Cl.
CPC .......... *C04B 26/045* (2013.01); *C04B 24/121* (2013.01); *E01C 7/36* (2013.01);
(Continued)

(58) Field of Classification Search
CPC ................ C04B 24/121; C04B 26/045; C04B 2103/0075; C04B 2111/00741;
(Continued)

(56) References Cited

U.S. PATENT DOCUMENTS

| 1,409,104 A ‡ | 3/1922 | Henderson ............... C08L 95/00 |
| | | 106/164.53 |
| 1,955,421 A ‡ | 4/1934 | Hayden ..................... E01C 3/06 |
| | | 404/82 |

(Continued)

FOREIGN PATENT DOCUMENTS

| CA | 2402162 C | ‡ | 8/2009 | ............... B09C 1/00 |
| CA | 2402162 C | | 8/2009 | |

(Continued)

OTHER PUBLICATIONS

Alfa Aesar. Organic Amines. [retrieved from the internet at Apr. 15, 2023 from <URL:https://www.alfa.com/en/organic-amines/>] (Year: 2015).‡

(Continued)

*Primary Examiner* — Raymond W Addie
(74) *Attorney, Agent, or Firm* — Emerson Thomson Bennett; Daniel A. Thomson

(57) ABSTRACT

Methods and compositions for the installation of scientifically engineered and constructed unpaved runways are disclosed herein. The compositions are heterogeneous mixtures produced by blending aliphatic or cyclic organic compounds with binders that chemically react with gravel, aggregate, and soil particles to create permanent bonds, resulting in a strengthened and stabilized surface. When blended into the aggregate of a runway surface, the organic compounds act as a carrier fluid, distributing the binder system evenly so particles of all sizes are thoroughly and uniformly coated with the composition. Once the composition is distributed, an adhesion promoting compound reacts with constituents in the aggregate to increase the formation and strength of chemical bonds between particles.

12 Claims, 4 Drawing Sheets

(51) Int. Cl.
*C04B 26/04* (2006.01)
*E01C 13/06* (2006.01)
*C04B 103/00* (2006.01)
*C04B 111/00* (2006.01)
*C04B 111/10* (2006.01)

(52) U.S. Cl.
CPC .... *E01C 13/065* (2013.01); *C04B 2103/0075* (2013.01); *C04B 2111/00741* (2013.01); *C04B 2111/0075* (2013.01); *C04B 2111/10* (2013.01)

(58) Field of Classification Search
CPC ......... C04B 2111/0075; C04B 2111/10; E01C 7/36; E01C 13/065
USPC .......................................................... 404/75
See application file for complete search history.

(56) References Cited

U.S. PATENT DOCUMENTS

| | | | | |
|---|---|---|---|---|
| 2,346,930 A ‡ | 4/1944 | Long | C04B 41/0081 | 427/418 |
| 2,535,644 A ‡ | 12/1950 | Martin | E01C 7/36 | 106/284 |
| 2,768,089 A * | 10/1956 | Erickson | C09K 17/18 | 106/900 |
| 2,937,581 A ‡ | 5/1960 | Havelin | E01C 3/04 | 404/76 |
| 3,084,058 A * | 4/1963 | Hemwall | B09C 1/08 | 501/148 |
| 3,518,924 A ‡ | 7/1970 | Gray | E01C 19/4893 | 404/98 |
| 3,817,643 A ‡ | 6/1974 | Azar | C09K 17/48 | 106/900 |
| 3,870,422 A * | 3/1975 | Medico, Jr. | E01C 7/142 | 404/31 |
| 4,113,401 A ‡ | 9/1978 | McDonald | E01C 11/005 | 404/75 |
| 4,139,676 A ‡ | 2/1979 | Janssen | C09K 17/30 | 427/136 |
| 4,708,516 A * | 11/1987 | Miller | E01C 7/18 | 404/31 |
| 4,836,856 A ‡ | 6/1989 | Klco | E01C 21/00 | 106/774 |
| 5,082,393 A ‡ | 1/1992 | Ringesten | E01C 3/006 | 404/43 |
| 5,362,176 A ‡ | 11/1994 | Sovik | E01C 19/006 | 404/72 |
| 5,378,079 A ‡ | 1/1995 | Omann | E01C 7/182 | 404/101 |
| 5,419,653 A * | 5/1995 | Hollon | E01C 7/34 | 404/82 |
| 5,820,302 A ‡ | 10/1998 | Roberts | C09K 17/12 | 106/900 |
| 6,558,081 B2 ‡ | 5/2003 | Hull | B09C 1/00 | 405/128.15 |
| 6,623,207 B2 ‡ | 9/2003 | Grubba | E01C 21/00 | 404/75 |
| 7,086,806 B2 ‡ | 8/2006 | Rickards | E01C 19/236 | 305/136 |
| 7,279,035 B2 ‡ | 10/2007 | Barnat | E01C 7/358 | 404/72 |
| 7,845,879 B2 ‡ | 12/2010 | Maier | E01C 21/00 | 427/136 |
| 7,878,731 B2 ‡ | 2/2011 | Maier | E02D 3/12 | 404/75 |
| 7,918,624 B2 ‡ | 4/2011 | Blacklidge | C08L 95/005 | 404/82 |
| 7,946,787 B2 ‡ | 5/2011 | Glee | E01C 19/004 | 404/75 |
| 8,348,547 B2 ‡ | 1/2013 | Quackenboss | E01C 3/04 | 427/136 |
| 8,419,312 B2 ‡ | 4/2013 | Vitale | C09D 5/1687 | 404/75 |
| 8,702,343 B1 ‡ | 4/2014 | Vitale | E01C 3/04 | 404/19 |
| 8,814,464 B2 ‡ | 8/2014 | McDade | E01C 19/48 | 404/36 |
| 8,814,465 B2 ‡ | 8/2014 | Vitale | C09K 17/20 | 404/19 |
| 9,637,870 B1 ‡ | 5/2017 | Coe | B32B 37/12 | |
| 2003/0223814 A1 ‡ | 12/2003 | Peltz | E01C 11/103 | 404/75 |
| 2004/0245494 A1 ‡ | 12/2004 | Horman | C09K 17/32 | 252/88.1 |
| 2010/0047015 A1 ‡ | 2/2010 | Takamura | E01C 7/353 | 404/31 |
| 2010/0129152 A1 ‡ | 5/2010 | Taylor | E01C 23/07 | 404/75 |
| 2012/0051839 A1 ‡ | 3/2012 | Begley | E01C 19/48 | 404/101 |
| 2012/0128419 A1 ‡ | 5/2012 | Menzenbach | E01C 23/065 | 404/90 |
| 2013/0011195 A1 ‡ | 1/2013 | Bower | C04B 20/1051 | 404/31 |
| 2013/0045049 A1 ‡ | 2/2013 | Krzyzak | E02B 11/00 | 404/31 |
| 2014/0109476 A1 * | 4/2014 | Kyrsiak | A01N 25/14 | 47/58.1 SC |
| 2014/0140767 A1 ‡ | 5/2014 | Vitale | E01C 7/00 | 404/75 |
| 2014/0270953 A1 ‡ | 9/2014 | Duffy | E01C 19/48 | 404/91 |
| 2014/0369749 A1 ‡ | 12/2014 | Friedman | C08K 11/00 | 404/72 |
| 2015/0147117 A1 ‡ | 5/2015 | Weaver | E01C 3/003 | 404/75 |
| 2016/0002473 A1 ‡ | 1/2016 | Yildirim | C09D 123/0853 | 427/136 |
| 2017/0145640 A1 ‡ | 5/2017 | Coe | C09D 119/003 | |
| 2017/0166792 A1 ‡ | 6/2017 | Ayambem | C10L 5/24 | |
| 2017/0218574 A1 ‡ | 8/2017 | Coe | E01C 19/4853 | |
| 2021/0071002 A1 ‡ | 3/2021 | Meyers | C08L 77/00 | |
| 2023/0227360 A1 * | 7/2023 | Vitale | E01C 13/065 | 106/808 |

FOREIGN PATENT DOCUMENTS

| | | | | |
|---|---|---|---|---|
| CA | 2584189 C | ‡ | 6/2012 | C09K 17/12 |
| CA | 2584189 C | | 6/2012 | |
| CA | 2796740 C | ‡ | 1/2017 | C04B 26/06 |
| CA | 2796740 C | | 1/2017 | |

OTHER PUBLICATIONS

Slide 15 of Structure Activity Relationships of Local Anesthetics. [retrieved from internet at Apr. 15, 2023 from <URL:https://slideplayer.com/slide/8063811/>]. (Year: 2017).‡

Slide 15 of Structure Activity Relationships of Local Anesthetics wayback. [retrieved from internet at Apr. 15, 2023 from <URL:https://web.archive.org/web/20170513171745/https://slideplayer.com/slide/8063811/>]. (Year: 2017).‡

\* cited by examiner
‡ imported from a related application

Untreated Surface Coarse Aggregate

After Incorporating SECUR 35 System and Compaction

After 30 Day Maturation of SECUR 35 System

1 Year Post Installation

3 Years Post Installation

5 Years Post Installation

METHOD FOR CONSTRUCTING SCIENTIFICALLY ENGINEERED AND CONSTRUCTED UNPAVED RUNWAYS

This application is a continuation of U.S. Ser. No. 17/393,513, filed Aug. 4, 2021, the contents of which are incorporated herein by reference. The present teaching relates to a method and composition for constructing unpaved runways and other trafficked surfaces.

I. BACKGROUND

Currently there are three widely accepted categories of runways based on their surface type and construction. Flexible Pavement Runways—A runway that is surfaced with a mixture of asphaltic or materials (asphalt and aggregate) from 3-5 inches or more in thickness. This pavement is designed so each structural layer is supported by the layer below and ultimately by the subgrade. Rigid Pavement Runways—A runway constructed from cement concrete or reinforced concrete slabs. This pavement is based on providing a structural cement concrete slab of sufficient strength to resist the loads from traffic and does not rely on underlying pavement layers to support the load. Unpaved or Gravel Runways—A runway with an unpaved surface constructed from a pavement with an unbound granular surface composed of gravel, aggregate, sand, clay, crushed stone or other soil materials.

Remote unpaved runways and their operators face a multitude of unique issues due to their climate, geographic location, available resources and performance requirements.

One of these issues is the risk of damage to an aircraft resulting from foreign object debris (FOD) striking the fuselage, propellors, and other components or being ingested into its engines. A gravel kit is a modification on an aircraft to avoid FOD damage or ingestion while operating on unpaved surfaces. These modifications generally include methods of preventing damage to the engines, underside of the fuselage and the wings. Gravel kits are vital to protecting aircrafts from FOD damage, keeping pilots safe and avoiding costly repairs. However, in recent decades, aircraft manufacturers have discontinued the installation of gravel kits and phased out older aircrafts equipped with gravel kits. As new aircrafts are being introduced to these remote runways, the need to eliminate FOD and its associated hazards has become essential to these remote unpaved runways and other trafficked surfaces. In addition to phasing out gravel kits, aircraft manufacturers generally do not provide warranties for aircrafts operating on unpaved gravel runways leaving the burden on the airlines and runway owners. Airlines and runway owners can be responsible for hundreds of thousands of dollars in aircraft repairs annually if the issue of FOD is not effectively addressed.

Due to the remote locations of most of the unsurfaced, gravel runway airports, the cost of runway construction can be extremely expensive. Acquiring quality aggregate is a costly and logistically complicated process because most locations are only accessible by air or water and do not have a network of all season roads connecting the runway and nearby villages to the rest of the state or province. Due to this, typically aggregate must be barged to the site, or a crusher must be transported and installed to produce aggregate onsite during the winter road season and the equipment demobilized out before the spring thaw. Both options are very costly. For a larger aircraft, such as a Boeing 737, an untreated unpaved runway can lose 3.5 to 9 tons of aggregate with each plane movement. Minimizing and preventing the loss of the existing runway aggregate is of utmost importance for reducing the life cycle costs of remote unpaved runways and other trafficked surfaces and keeping them operationally safe.

The cold climate in which most unpaved runways and other trafficked surfaces are located creates additional issues and limits the products/chemistries that can be used for surface treatment, stabilization and dust control. The reduced strength of a gravel runway (compared to a paved surface) can result in deflection of the surface under an imposed aircraft load, leading to an increase in rolling resistance. Additionally, a gravel runway is subject to the seasonal impact of freeze-thaw cycles, which further reduce strength of the runway surface. During acceleration for take-off, the distance to accelerate the aircraft to lift-off speed will be increased. This results in increased take-off distances and can result in increased accelerate-stop distances. These penalties, as defined in the Commercial Air Service Standard, require an additional 10% distance for small aircrafts and 15% for large aircrafts. The surface characteristics of an unpaved runway can also have adverse effects on the braking performance of the aircraft as well as steering. An unbound, loose surface will result in degraded braking performance compared to a paved hard surface. Brake anti-skid systems that are optimized for paved hard surfaces do not achieve the same performance on unbound gravel surfaces. This will also result in increased stopping distances during take-off and landing.

Temperatures in remote northern locations can reach as low as −70 F. Due to the cold climate, products that require the addition of water or that can freeze during storage are not viable options. Cold climates also prohibit the use of products that require evaporation to facilitate curing. Another challenge of applying stabilization or dust control agents in cold regions is the impact of maintenance and snow removal. When topically applied, the dust suppressant is concentrated in the upper 0.5-2" of the runway surface. The majority of the dust palliative can easily be removed or buried with one improper grading or snow removal.

There are several major challenges for operators of runways in cold, remote locations as a result of climate change. During winter months the aggregate and fines in a gravel runway are locked in place by winter freezing. This improves runway strength and allows the runway to service aircraft without restrictions. The duration of the winter freeze has declined from seven months to five months in recent years, greatly reducing the window of serviceability. In many locations, runway operators are removing the snowpack in order to prevent snow cover from insulating and thawing the surface. While this improves the strength of the runway when temperatures are sub-freezing, it can be detrimental when the surface thaws because of the loss of gravel and fines from grading operations.

II. SUMMARY

The present teaching has several benefits over prior formulations of this composition. It contains an adhesion promoting compound that establishes the formation and increases the strength of chemical bonds between the fatty acid compounds in the product and constituents in the aggregate. The adhesion promoting compound enhances the strength and durability of the surface, leading to less frequent repairs and greater longevity of the installation. The key performance attributes of this installation are a bound surface with a tightly tethered matrix that is highly resistant to displacement, a tough and flexible surface that is reworkable and continuously active, and a surface with low maintenance requirements and extended critical service life. The characteristics of these adhesion promoting compounds provide improved mechanical properties in the product that lead to increased performance attributes, including: higher CBR values, greater stiffness and uniformity, improved resistance to moisture, reduction in seasonal soft-spots, increased resistance to freeze thaw damage, protection of underlying layers, void reduction, lower rolling resistance, improved braking, year round serviceability, minimized foreign object debris (FOD), and a uniform and consistent installation process.

One aspect of the present teaching is a dual mechanism approach in which an innovative installation technique is used in conjunction with a preservation agent to create a hard surface runway. The result is a runway specifically designed to improve safety, quality, resilience, performance, durability, and service life of the runway. This improves the efficiency and cost-effectiveness of repairs, treatment, maintenance, preservation, rehabilitation, reconstruction, and replacement of lost gravel on runways and other trafficked surfaces. This dual mechanism approach best fulfills the role of Federal, State, and Provincial Governments in improving runway infrastructure. These improvements have potential to provide profound social and economic benefits for remote locations, including reliable medivac operations and medical supply transfer, dependable transportation of resources, increased reliability for tourism related transportation, and ability to transport increased payloads.

The present teaching includes a synthetic isoalkane and a binder consisting essentially of a carboxylic acid, ester, or a thermoplastic polyolefin. This composition provides superior dust control, fines preservation, and stabilization, and creates a hard, smooth, durable gravel or aggregate surface to ensure rural aviation reliability, safety, and service. This results in higher aggregate density with fewer surface voids, loss of material, reduction of foreign object debris (FOD), reduced formation of potholes, rutting and wash boarding, and elimination of gravel float and segregation. This also results in improved air and water quality through reduction of airborne particulates and soil erosion. In addition, the present teaching can be applied neat, or undiluted, eliminating the chances of collateral runoff. The present teaching also remains active over long periods of time, requiring fewer maintenance applications. It is insoluble in water, resisting rain and inclement weather, and contains no electrolytes, thereby inhibiting corrosion.

Performance benefits of the present teaching include improved aircraft steering, braking performance and lower rolling resistance, which result in lower penalties for aircraft take-off and landing. Additional benefits include protection of underlying runway layers, freeze-thaw stability, product stability at temperatures down to −70 F, year-round serviceability, elimination of soft spots, improved runway uniformity, and reduction of maintenance requirements. The impact of freeze and thaw cycles on the stability, strength, and integrity of the treated gravel surface are minimized because water cannot permeate below the surface where the freeze thaw cycle weakens these layers occurs.

The adhesion promoting compounds in this aspect act by migrating to the interface between the product and the aggregate where it permanently bonds with the aggregate and causes a chemical reaction as the product cures. The adhesion promoter acts as a chemical bridge between the aggregate and the organic fatty acid esters or polyolefins in the composition, creating an extremely durable yet flexible Scientifically Engineered and Constructed Unpaved Runway (SECUR) surface.

The adhesion promoting compounds in this aspect create an interphase region that is resistant to chemical attack from the environment. Adhesion promoters may consist of molecules with short organic chains that form primary bonds with both the aggregate and the organic fatty acid esters or polyolefins in the composition. These bonds provide resistance to water, salt, and adverse weather conditions.

A heterogeneous mixture is produced by blending aliphatic or cyclic organic compounds with carboxylic acids of chemical structure R—COOH and applied to gravel, aggregate and soils in a manner to produce high levels of dust control and stabilization, creating a surface with higher CBR strength, greater stiffness, water resistance, and void elimination. The aliphatic and cyclic compounds act as plasticizers and carriers for the carboxylic acids and adhesion promoter. When applied to gravel, aggregate and soil the carrier provides a mechanism for the carboxylic acid and adhesion promoter to penetrate the gravel, aggregate and soil and also acts as a dust suppressing weighting agent. The plasticized carboxylic acid provides a durable, reworkable binder that associates small particulates while stabilizing gravel, aggregate and soil. The adhesion promoting compound increases the formation and strength of chemical bonds between the aggregate and the carboxylic acids, increasing the strength and durability of the installed surface. The chemical agent is manufactured and applied using conventional mixing equipment.

The present teaching also encompasses a heterogeneous mixture produced by blending aliphatic or cyclic organic compounds with polyolefins of chemical structure $C_nH_{2n}$ or $R—C_{2n}H_{3n}$, and applied to gravel or aggregate or soils in a manner to produce high levels of dust control and soil stabilization, creating a hard and durable surface in areas of intense use. The aliphatic and cyclic compounds act as plasticizers and carriers for the polyolefin and adhesion promoter to penetrate the gravel, aggregate and soil and also acts as a dust suppressing weighting agent. The plasticized polyolefin provides a durable, reworkable binder that associates small particulates while stabilizing gravel, aggregate and soil. The adhesion promoting compound increases the formation and strength of chemical bonds between the aggregate and the polyolefin, increasing the strength and durability of the installed surface. The chemical agent is manufactured and applied using conventional mixing and applied using conventional construction equipment.

The present teaching is a proactive system engineered to produce an irreversibly bound surface layer capable of preserving the as-constructed condition of a runway for much longer than achieved under current practices. The compound, instead of being topically applied, can be installed into the upper layer of the existing runway surface during the reconstruction/rehabilitation of unpaved runways or other trafficked surfaces. This is realized by locking the gravel and fines in place via a binder system. By securing the gravel and fines to the surface, harmful dust, loose aggregate and FOD are reduced and even eliminated.

Still other benefits and advantages of the present subject matter will become apparent to those skilled in the art to which it pertains upon a reading and understanding of the following detailed specification.

III. BRIEF DESCRIPTION OF THE DRAWINGS

The present teachings are described hereinafter with reference to the accompanying drawings.

IV. DESCRIPTION

The present teaching described herein consists of aliphatic and cyclic organic compounds utilized as plasticizers and carriers that are blended with materials composed primarily of carboxylic acids and an adhesion promoter and applied in a manner to produce improved levels of dust and erosion control, and soil stabilization.

A novel and unexpected result occurs when carboxylic acids are blended with aliphatic or cyclic organic plasticizers and carriers. These blends are processed into either heterogeneous mixtures or emulsions that when applied to soil, gravel, aggregate, or minerals provide high levels of long lasting dust control and stabilization. The present teaching exhibits tremendous moisture resistance, re-workability, and working life, while being non-corrosive and non-hazardous. The addition of adhesion promoters enhances the chemical reactivity of the carboxylic acids, improving bond strength and resistance to degradation.

Aliphatic organic compounds refers to saturated and unsaturated hydrocarbons derived from petroleum, coal, biomass, or Fischer Tropsch or synthetic manufacturing including paraffins or alkanes, isoparaffins or isoalkanes, olefins, alkenes, and alkadienes, alcohols, ethers, aldehydes, ketones, carboxylic acids, estolides, and carbohydrates. The composition comprises 0-95% by weight of these compounds.

Cyclic organic compounds refer to alicyclic hydrocarbons, cycloparaffins, cyclo-isoparaffins, cyclo-olefins, cyclo-acetylenes, aromatic hydrocarbons, heterocyclics, and any combinations of aliphatic and cyclic structures such as terpenes, amino acids, proteins, and nucleic acids. The composition comprises 0-95% by weight of these compounds.

Carboxylic acid refers to any substance whose major constituents are saturated or unsaturated fatty acids and their esters derived from animal or vegetable fat or oil; and vegetable derived resins or rosin acids, all represented chemically R—COOH. The composition comprises 5-70% by weight of these substances.

Plasticizer refers to organic compounds added to carboxylic acids and adhesion promoter to facilitate processing and increase the flexibility and durability of the final product.

Carrier refers to any organic compounds in which carboxylic acids and adhesion promoter are miscible in and serve as a vehicle to aid in the dispersion and penetration of plasticized carboxylic acids into the gravel, aggregate, and soil.

Heterogeneous mixtures refer to mixtures or solutions comprised of two or more substances, whether or not they are uniformly dispersed.

Emulsions refer to mixtures of two or more immiscible liquids held in suspension by small percentages of emulsifiers. Emulsifiers can be protein or carbohydrate polymers or long-chained alcohols and fatty acids. The emulsions can either be oil-in-water or water-in-oil continuous phase mixtures.

Figure 1:
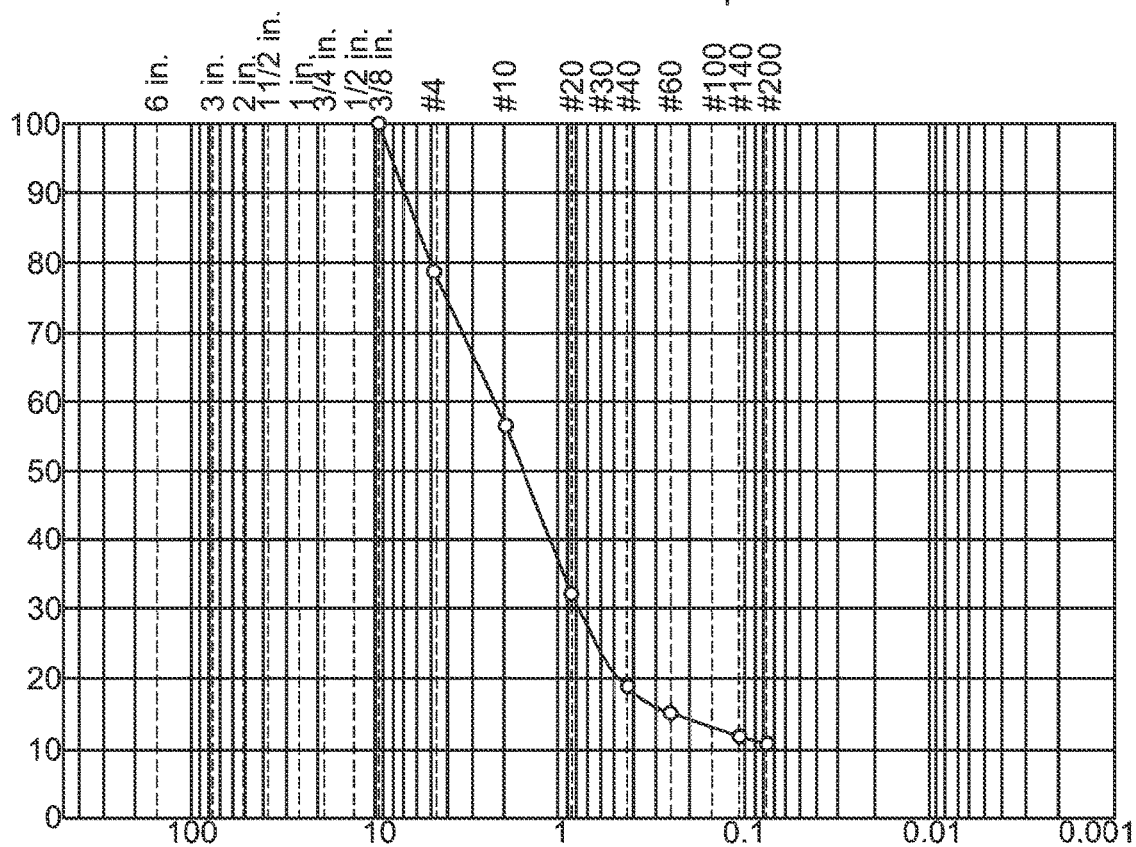
FIG. 1 is a particle size distribution curve from a CBR test conducted on aggregate.
Figure 2:
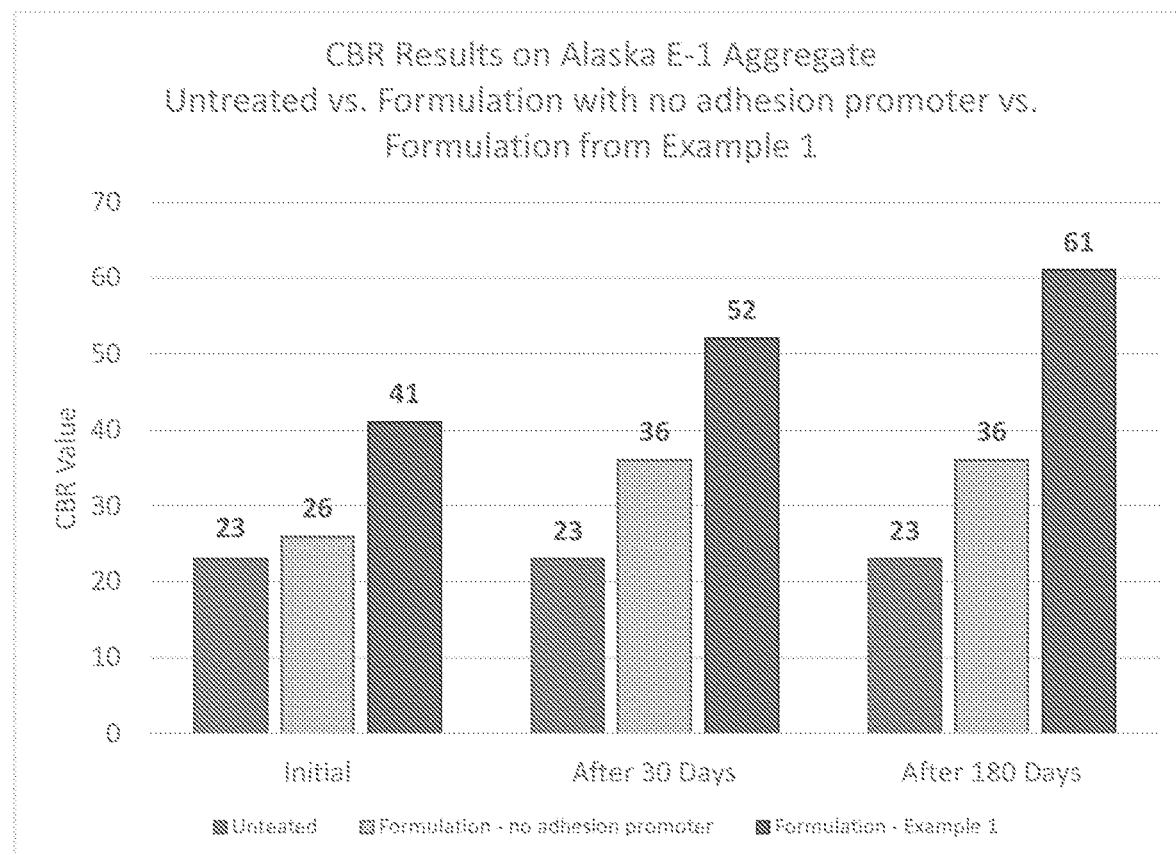
FIG. 2 shows the surface CBR value over time for an unpaved surface that has not been treated, an unpaved surface treated with a formulation containing no adhesion promoter, and the formulation with an adhesion promoting compound.
Figure 3A:
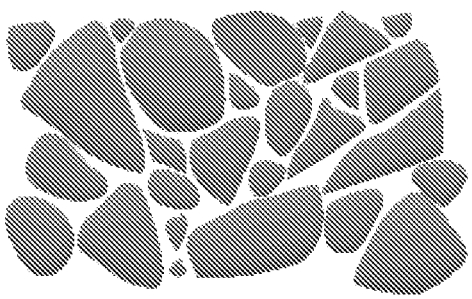
FIGS. 3A-3F show life cycle performance of aggregate.
Figure 3B:
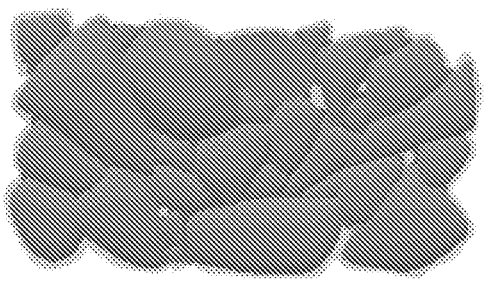

Adhesion promoting compounds or adhesion promoters refers to any compound added to the formulation to improve aggregate coating and increase the strength and frequency of chemical bonding between the formulation and aggregate. FIG. 3A shows untreated surface coarse aggregate. FIG. 3B represents the aggregate after the composition is applied and incorporated into the aggregate surface course, allowing for a uniform coating of every particle. Immediately upon contact, the composition physically adheres to every particle and the chemical adhesion process begins. After compaction to 7% or less air voids, the composition is physically and chemically adhered to every particle. In addition to the natural particle interlock and friction, cohesion and chemical bonding between aggregate particles is increased, thereby locking every particle into a bound matrix.

Figure 3C:
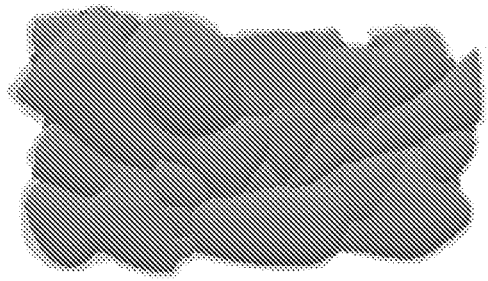

With reference to FIG. 3C, after thirty days, routine compaction and traffic loading further tightens the runway surface. The chemical reaction and bonding process begins after application and after a 180-day maturation period, the process is complete. The preservation agent has irreversibly transformed from a liquid to an insoluble solid, which cannot be displaced or leached from the particles. This creates a hard, bound surface runway that resists surface deterioration and moisture infiltration.

Figure 3D:
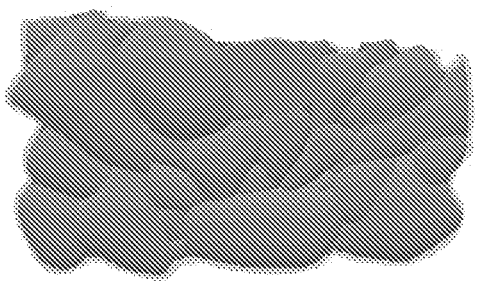

With reference to FIG. 3D, the composition continues to maintain the as-constructed condition of the runway through the first year of service. The tightly bound surface is mostly void of loose gravel and surface deterioration. Precipitation is shed from the runway surface allowing it to hold up through freeze/thaw cycles. The composition continues to suppress dust emissions by over 85%.

Figure 3E:

With reference to FIG. 3E, after about three years, the runway surface will begin to show early signs of deterioration. Some of the smaller particles become dislodged and removed as the topcoat is worn down from traffic abrasion. Overall, the runway is performing very well with minimal loose particles present on the surface. The runway remains densely compacted but could benefit from a recommended maintenance topical application to bind all loose surface particles, rejuvenate the ground inventory, and eliminate dust emissions.

Figure 3F:
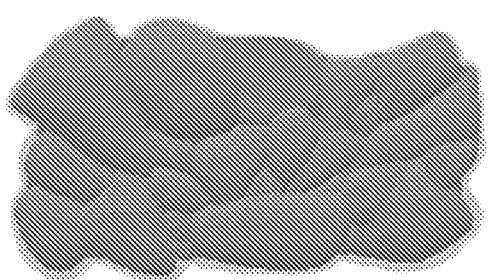

With reference to FIG. 3F, a rejuvenating topcoat is topically applied between 3-5 years post application based on specific runway conditions to bind all loose surface particles and revitalize the performance. After the topcoat is applied, compaction is recommended to embed any loose aggregate and maintain a densely bound, hard surface. Five years after the installation the runway has lost minimal aggregate and requires very little maintenance.

Figure 4:
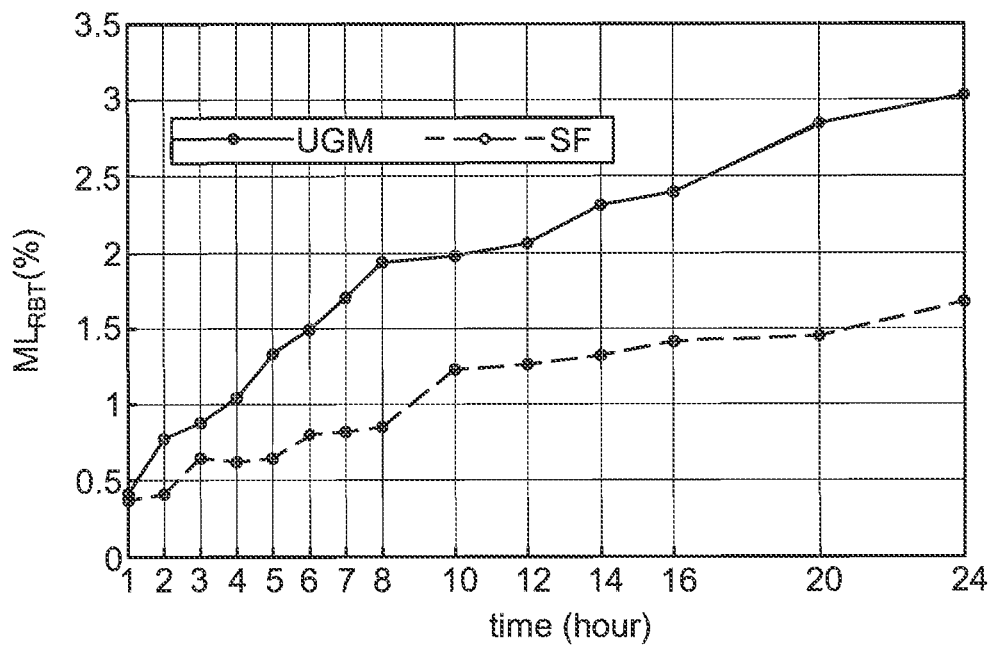
FIG. 4 shows the mass loss in the Rolling Bottle Test ($ML_{RBT}$) for each tested time interval for uncoated aggregate and aggregate coated with the formulation containing adhesion promoter.
Figure 5:
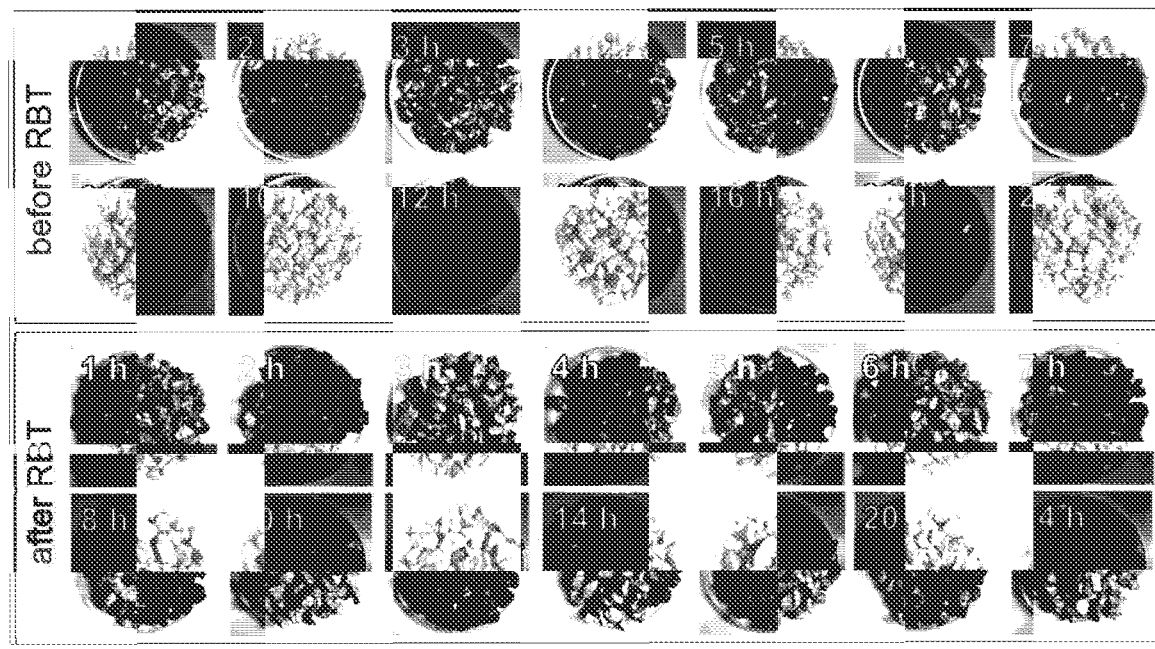
FIG. 5 shows fourteen Rolling Bottle Test (RBT) samples tested based on various rotating time intervals.

With reference to FIGS. 4 and 5, susceptibility to stripping, as determined by the Rolling Bottle Test method, is an indirect measure of the power of a binder to adhere to various aggregates, or of various binders to adhere to a given aggregate. The procedure can also be used to evaluate the effect of moisture on a given aggregate-binder combination with or without adhesion promoting compounds including liquids, such as amines, and fillers, such as hydrated lime or cement. In the rolling bottle method, the affinity is expressed by visual registration of the degree of product coverage on uncompacted mineral aggregate particles after influence of mechanical stirring action in the presence of water. Test results show a smaller amount of mass is lost for aggregate treated with the formulation containing an adhesion promoting compound.

California Bearing Ratio (CBR) refers to a measure of the load bearing capacity of a given sample of gravel, aggregate and soil expressed as a ratio relative to the load bearing capacity of crushed limestone. The surface shear strength of an unpaved runway is expressed as a CBR value. The bearing strength of crushed limestone has been adopted as one of the criteria to which other types of gravel, aggregate, and soil, are compared. Limestone has a CBR value of 100, which is expressed as CBR 100. A gravel, aggregate, and soil with a CBR of 10 has 10% of the bearing strength of crushed limestone.

Foreign Object Debris (FOD) refers to any foreign object that does not belong on the runway, taxiway, or ramp area including broken pavement and loose stones. FOD can be ingested in an aircraft engine, which can result in damage to the aircraft or cause an accident.

Optimum moisture content refers to the water content at which a gravel, aggregate or soil can be compacted to the maximum dry unit weight by a given compactive effort.

Fines refer to fine grained soils which are soil particles having a diameter of less than 75 microns. Fines are divided into two categories: silt and clay. Soil particles with a diameter range of 75 microns to 2 microns are referred to as silt. Soil particles smaller than 2 micron are referred to as clay.

The present teaching is manufactured using conventional manufacturing equipment. Conventional mixers, emulsifiers, or colloid mills are utilized to blend these components into stable heterogeneous mixers or emulsions.

Once applied the liquid penetrates into the gravel, aggregate, or soil for dust control, fines preservation, and stabilization. A particle weighting and loading mechanism is achieved through adsorption and adherence of molecules to the surface of the particles. Also, the liquid absorbs and penetrates into the inner structure of the particles.

By incorporating and installing the present teachings, the preservation agent is evenly distributed throughout the entire installation, resulting in increased CBR strength of the whole layer. More uniform distribution allows for optimal coating of particles which when reacted with the aggregate creates a more durable and stronger bound surface. This is proven in laboratory testing shown below which demonstrates a CBR increase of over 100% after the 30-day maturation when using the present teachings with runway surfacing aggregate.

Surface aggregate is installed at a recommended particle size distribution, but without proper preservation and stabilization the aggregate loses its fines through dust emissions, abrasion, runoff, and jet/prop blasts. The fines act as a natural glue and maintain maximum compaction, interparticle friction, and reducing moisture infiltration. As they are removed by aircraft traffic and erosion, the surface begins to destabilize resulting in a loose surface prone to further deterioration. Loose surfaces can result in costly aircraft damage and increased risk of pilot and passenger safety due to Foreign Object Debris. This is a major issue for most unpaved runways and other trafficked surfaces that the applicant has assessed in the last 10 years. The present teaching is engineered and constructed to proactively protect the runway surface from becoming loose and deteriorating after repeated exposure to aircraft movements. This is achieved by keeping the aggregate and fines locked into the surface course using adhesion, cohesion, and chemical bonding. The binder component reduces surface erosion and dust emissions generated from simulated aircraft movements up to 96%. This extends the service life, reduces maintenance, delays costly overlays, and keeps the runway in safe operable condition. Aggregate with low fines has grain to grain contact, low stability unless confined, is permeable, difficult to obtain uniform compaction, and generates excess float. On the other hand, aggregate with proper fines has good strength, good stability, good performance, requires some compactive effort, and is resistant to abrasion and moisture infiltration.

In one aspect of the present teaching, after the runway base has been installed and any weak spots have been remediated, the crushed aggregate surface course is uniformly spread to the proper depth in accordance with the design specifications. The crushed aggregate course can be profiled with a 2 to 2.5% crown which extends from the centerline of the runway to each shoulder. Water is then added to the newly placed crushed aggregate until the material is at an optimum moisture content, as determined by laboratory proctor testing. About 40% of the recommended composition is applied to the crushed gravel surface using a sprayer. A grader is then used to windrow the upper two to three inches of the treated aggregate to each side of the runway. Then an additional 40% of the composition can be added to the runway surface, although in one aspect, this is not applied to the windrowed two inches of treated aggregate. Again, use a grader to windrow the recently treated upper two to three inches of aggregate to each side of the runway. Then the grader is used to grade the treated windrowed aggregate back on to the runway. Once the treated surface aggregate is at or near optimum moisture content, the treated surface layer is compacted to between about 95% to about 98% density. After the treated surface layer is compacted, the remaining about 20% of composition is topically applied to the compacted surface. Compaction can be applied over the next several days to create a tightly bound, pavement-like surface.

In another aspect of the present teaching, a reclaimer can be used to reclaim about four to six inches of a runway, and 80% of the composition can be applied in one pass, with the remaining 20% being used as a seal coat.

EXAMPLES

Example 1

This example discloses a formulation for producing a heterogeneous mixture depicted in the present teaching.

| Constituent | Trade Name | Manufacturer | Weight % |
|---|---|---|---|
| 1. Synthetic iso-alkanes | DSF-65 ™ | Petro-Canada | 62% |
| 2. Mixture of chain and tricyclic organic chemical acids and esters of sterols and fatty acids | RTOP ™ | Arboris | 35% |
| 3. Fatty acid amine derivative | Indulin ® R20 | Ingevity | 3% |

The Arboris material is maintained at 45-135 degrees centigrade and blended into the remaining materials using conventional blending equipment or agitation.

Example 2

This example discloses a formulation for producing a heterogeneous mixture depicted in the present teaching.

| Constituent | Trade Name | Manufacturer | Weight % |
|---|---|---|---|
| 1. Synthetic iso-alkanes | DSF-65 ™ | Petro-Canada | 63% |
| 2. Mixture of chain and tricyclic organic chemical acids and esters of sterols and fatty acids | RTOP ™ | Arboris | 35% |
| 3. High molecular weight block copolymer | BYK ® 4500 | BYK USA, Inc. | 2% |

The Arboris material is maintained at 45-135 degrees centigrade and blended into the remaining materials using conventional blending equipment or agitation.

The present teaching described herein consists of aliphatic and cyclic organic compounds utilized as plasticizers and carriers that are blended with materials composed primarily of thermoplastic polyolefin compounds and an adhesion promoter and applied in a manner to produce improved levels of dust and erosion control, and gravel, aggregate and soil stabilization.

A novel and unexpected result occurs when thermoplastic polyolefin compounds are blended with aliphatic or cyclic organic plasticizers and carriers. These blends are processed into either heterogeneous mixtures or emulsions that when applied to soil, gravel, aggregate, or minerals provide high levels of long lasting dust control and stabilization. The present teaching exhibits tremendous moisture resistance, re-workability, and working life, while being non-corrosive and non-hazardous. The addition of adhesion promoters enhances the binding activity of the thermoplastic polyolefin compounds, improving bond strength and resistance to degradation.

Aliphatic organic compounds refers to saturated and unsaturated hydrocarbons derived from petroleum, coal, Fischer Tropsch, or synthetic manufacturing including paraffins or alkanes, isoparaffins or isoalkanes, olefins, alkenes, estolides, and alkadienes, alcohols, ethers, aldehydes, ketones, carboxylic acids, and carbohydrates. The composition comprises 0-95% by weight of these compounds.

Cyclic organic compounds refer to alicyclic hydrocarbons, cycloparaffins, cyclo-isoparaffins, cyclo-olefins, cyclo-acetylenes, aromatic hydrocarbons, heterocyclics, and any combinations of aliphatic and cyclic structures such as terpenes, amino acids, proteins and nucleic acids. The composition comprises 0-95% by weight of these compounds.

Thermoplastic polyolefin compound refers to any substance derived from olefins with chemical structure $C_nH_{2n}$ or $R-C_{2n}H_{3n}$, including polyethylene, polypropylene, polybutenes, polyisobutylenes, polyisoprene, and their copolymers. The composition comprises 2-90% by weight of these substances.

Plasticizer refers to organic compounds added to carboxylic acids and adhesion promoter to facilitate processing and increase the flexibility and durability of the final product.

Carrier refers to any organic compounds in which carboxylic acids and adhesion promoter are miscible in and serve as a vehicle to aid in the dispersion and penetration of plasticized carboxylic acids into the gravel, aggregate, or soil.

Heterogeneous mixtures refer to mixtures or solutions comprised of two or more substances, whether or not they are uniformly dispersed.

Emulsions refer to mixtures of two or more immiscible liquids held in suspension by small percentages of emulsifiers. Emulsifiers can be protein or carbohydrate polymers or long-chained alcohols and fatty acids. The emulsions can either be oil-in-water or water-in-oil continuous phase mixtures.

Adhesion promoting compounds or adhesion promoters refers to any compound added to the formulation to improve aggregate coating and increase the strength and frequency of chemical bonding between the formulation and aggregate. The adhesion promoting compound can be chosen from organic amines, amides, polyamides, borates, imidazoline amides, amide esters, aminoesters, copolymers with amine based functional groups, silanes, organosilanes, or siloxanes.

Once applied, the liquid penetrates into the gravel, aggregate, or soil where two mechanisms for dust control, fines preservation, and stabilization contribute to the effect. The first is a particle weighting and loading mechanism achieved through the processes of absorption, adherence of molecules to the surface of particles and absorption, penetration of the substance into the inner structure of the particles.

The second mechanism is produced by the plasticized polymeric polyolefin compounds which act as binders. The thermoplastic polyolefin compounds bind particles into a tightly cohesive base when subjected to compactive forces. The plasticized polyolefin compounds remain active even through severe wet weather and mechanical disturbances from heavy tracked vehicles and steel-chained tires. The present teaching displays a unique and unexpected ability to be recompacted into a tightly associated base when disturbed, dramatically extending the working life of the chemical agents.

Example 3

This example discloses a formulation for producing a heterogeneous mixture as disclosed in the present teaching.

| Constituent | Trade Name | Manufacturer | Weight % |
|---|---|---|---|
| 1. Synthetic iso-alkanes | DSF-65 ™ | Petro-Canada | 64% |
| 2. Polyisobutylene | TPC ™ 1160 | TPC, Inc. | 33% |
| 3. Fatty acid amine derivative | Indulin ® R20 | Ingevity | 3% |

The TPC™ 1160 material is maintained at 45-135 degrees centigrade and blended into the remaining materials using conventional blending equipment or agitation.

DSF 65 is a mixture of saturated hydrocarbons, and does not contain aromatic groups, double bonds, or triple bonds. DSF-65 has a carbon range of C16-C31, with over 80% being in the C16-C25 range, with the average number of carbons being 21 or 22. DSF-65 has no aromatic content and no unsaturated content. DSF 65 contains some normal alkanes (linear alkanes with no methyl branches), but it is primarily a mixture of saturated mono-methyl, di-methyl, and tri-methyl branched alkanes. The average degree of methylation for the entire DSF 65 would be in the 1.77-2.58 range. DSF-65 is comprised of 10-30% mono-methyl acyclic aliphatic compounds, 10-50% di-methyl acyclic aliphatic compounds, and 5-30% tri-methyl acyclic aliphatic compounds.

Clause 1—A compound for chemical gravel, aggregate and soil stabilization, as-constructed preservation, erosion control, smooth hard surface creation, fines preservation, and dust control, the compound comprising a binder comprising a carboxylic acid, an ester, or a thermoplastic polyolefin, a synthetic isoalkane, and an adhesion promoting compound.

Clause 2—The compound of clause 1, wherein the binder is a carboxylic acid.

Clause 3—The compound of clauses 1 or 2, wherein the carboxylic acid is a fatty acid.

Clause 4—The compound of clauses 1-3, wherein the compound is devoid of electrolytes.

Clause 5—The compound of clauses 1-4, wherein the compound comprises from about 1 to about 99% by weight of the carboxylic acid.

Clause 6—The compound of clauses 1-5, wherein the compound further comprises an emulsifier.

Clause 7—The compound of clauses 1-6, wherein the synthetic isoalkane is selected from a group consisting of synthetic and semi-synthetic hydrocarbons.

Clause 8—The compound of clauses 1-7, wherein the synthetic hydrocarbons are selected from a group produced from hydrotreating, hydrocracking, or hydroisomerization.

Clause 9—The compound of clauses 1-8, wherein the synthetic isoalkane is selected from chemical group consisting of isoalkanes and branched iso-paraffins.

Clause 10—The compound of clauses 1-9, wherein the adhesion promoting compound is selected from a group consisting of organic amines, amides, polyamides, borates, imidazoline amides, amide esters, aminoesters, copolymers with amine based functional groups, silanes, organosilanes, and siloxanes.

Clause 11—The compound of clauses 1-10, wherein the binder is a thermoplastic polyolefin.

Clause 12—The compound of clauses 1-11, wherein the compound comprises from about 1 to about 99% by weight of the thermoplastic polyolefin.

Clause 13—The compound of clauses 1-12, wherein the isoalkane has a viscosity of at least about 19 centistokes @20° C., a flame point greater than 130° C., and a flash point of 177° C.

Clause 14—The compound of clauses 1-13, wherein the synthetic isoalkane is selected from chemical group consisting of isoalkanes and branched iso-paraffins.

Clause 15—The compound of clauses 1-14, wherein the synthetic isoalkane has a flash point of 177° C.

Clause 16—An unpaved surface comprising gravel, aggregate and soil, a binder comprising a carboxylic acid, an ester, or a thermoplastic polyolefin, a synthetic isoalkane, and an adhesion promoting compound, wherein the binder, synthetic isoalkane, and adhesion promoting compound are mixed with the gravel, aggregate and soil to form the runway, wherein the runway contains no asphalt.

Clause 17—The surface of clause 16, wherein the binder is a carboxylic acid, wherein the compound is devoid of electrolytes.

Clause 18—The compound of clause 16 or 17, wherein the compound further comprises an emulsifier, wherein the synthetic isoalkane is selected from a group consisting of synthetic and semi-synthetic hydrocarbons, wherein the synthetic hydrocarbons are selected from a group produced from hydrotreating, hydrocracking, or hydroisomerization.

Clause 19—The compound of clauses 16-18, wherein the adhesion promoting compound is selected from a group consisting of organic amines, amides, polyamides, imidazoline amides, amide esters, aminoesters, copolymers with amine based functional groups, silanes, organosilanes, and siloxanes.

Clause 20—The compound of clauses 16-19, wherein the binder is a thermoplastic polyolefin, wherein the isoalkane has a viscosity of at least about 19 centistokes @20° C., a flame point greater than 130° C., and a flash point of 177° C., wherein the synthetic isoalkane is selected from chemical group consisting of isoalkanes and branched iso-paraffins.

Clause 21—A method for constructing an unpaved surface including spreading crushed aggregate over an associated base, adding liquid to the crushed aggregate to a certain moisture content, applying a composition to the moistened aggregate, wherein the composition includes a binder including a carboxylic acid, an ester, or a thermoplastic polyolefin, a synthetic isoalkane, and an adhesion promoting compound.

Clause 22—The method of clause 21, wherein the method further includes grading a top layer of the treated aggregate to sides of the unpaved surface, applying the composition to the unpaved surface, and moving the top layer of the treated aggregate to the unpaved surface.

Clause 23—The method of clauses 21 or 22, wherein the method further includes compacting the treated aggregate.

Clause 24—The method of clauses 21-23, wherein the method further includes profiling the treated aggregate with a crown extending from a centerline to each shoulder of the unpaved surface.

Clause 25—The method of clauses 21-24, wherein the method further includes applying the composition to the compacted aggregate, wherein about 40% of the composition is applied to the moistened aggregate, about 40% of the composition is applied to the unpaved surface, and about 20% of the composition is applied to the compacted aggregate.

Clause 26—The method of clauses 21-25, wherein the method further includes reclaiming a layer of the unpaved surface and applying the composition as a seal coat.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

Having thus described the present teachings, it is now claimed:

What is claimed is:

1. A method for constructing an unpaved surface, the method comprising the steps of:
   spreading crushed aggregate over an associated base;
   adding liquid to the crushed aggregate to a certain moisture content;
   applying about 40% of a composition to the moistened aggregate, wherein the composition comprises:
      a binder comprising:
         a carboxylic acid, an ester, or a thermoplastic polyolefin;
         a synthetic isoalkane; and
         an adhesion promoting compound, wherein the adhesion promoting compound is selected from a group consisting of organic amines, polyamides, borates, imidazoline amides, amide esters, aminoesters, silanes, and siloxanes grading a top layer of the treated aggregate to sides of the unpaved surface;
   applying about 40% of the composition to the unpaved surface;
   moving the top layer of the treated aggregate to the unpaved surface;
   compacting the treated aggregate; and
   applying about 20% of the composition to the compacted aggregate.

2. The method of claim 1, wherein the composition has irreversibly transformed from a liquid to an insoluble solid, which cannot be displaced or leached from the aggregate.

3. The method of claim 1, wherein the method further comprises the step of:
applying a rejuvenating topcoat; and
compacting the topcoat.

4. The method of claim 1, wherein the method further comprises the step of:
profiling the treated aggregate with a crown extending from a centerline to each shoulder of the unpaved surface.

5. The method of claim 1, wherein the isoalkane has a viscosity of at least about 9 centistokes at 20° C., a flame point greater than 130° C., and a flash point of 177° C.

6. The method of claim 1, after compaction to about 7% or less air voids, the composition is physically and chemically adhered to the aggregate, thereby locking the aggregate into a bound matrix.

7. The method of claim 1, wherein the binder is a carboxylic acid.

8. The method of claim 7, wherein the carboxylic acid is a fatty acid, wherein the compound is devoid of electrolytes.

9. The method of claim 7, wherein the composition further comprises an emulsifier.

10. The method of claim 1, wherein the synthetic isoalkane is selected from a group produced from hydrotreating, hydrocracking, or hydroisomerization.

11. A method for constructing an unpaved surface, the method comprising the steps of:
spreading crushed aggregate over an associated base;
adding liquid to the crushed aggregate to a certain moisture content;
applying a composition to the moistened aggregate, wherein the composition comprises:
a binder comprising:
a carboxylic acid, an ester, or a thermoplastic polyolefin;
a synthetic isoalkane; and
an adhesion promoting compound, wherein the adhesion promoting compound is selected from a group consisting of organic amines, polyamides, borates, imidazoline amides, amide esters, aminoesters, silanes, and siloxanes;
reclaiming a layer of the unpaved surface; and
applying the composition as a seal coat.

12. A method for constructing an unpaved surface, the method comprising the steps of:
spreading crushed aggregate over an associated base, wherein the crushed aggregate is profiled with a 2 to 2.5% crown which extends from a centerline of the unpaved surface to each shoulder;
adding liquid to the crushed aggregate to a certain moisture content;
applying a composition to the moistened aggregate, wherein the composition comprises:
a binder comprising:
a carboxylic acid, an ester, or a thermoplastic polyolefin;
a synthetic isoalkane; and
an adhesion promoting compound, wherein the adhesion promoting compound is selected from a group consisting of organic amines, polyamides, borates, imidazoline amides, amide esters, aminoesters, silanes, and siloxanes;
windrowing about two to three inches of the treated aggregate to each side of the unpaved surface;
adding an additional of the composition to the unpaved surface;
using a grader to windrow again the upper two to three inches of the treated aggregate;
grading the windrowed aggregate back on to the unpaved surface;
once the treated aggregate is at or near optimum moisture content, the treated surface layer is compacted to between about 95% to about 98% density; and
after compaction, the remaining about 20% of the composition is topically applied to the compacted surface.

* * * * *